(12) United States Patent
Davlos et al.

(10) Patent No.: US 11,321,151 B2
(45) Date of Patent: May 3, 2022

(54) AUTOMATED TROUBLESHOOTING SYSTEM AND METHOD FOR PERFORMING AN ACTION ON A USER DEVICE

(71) Applicant: JIO PLATFORMS LIMITED, Mumbai (IN)

(72) Inventors: Efstratios Davlos, Mumbai (IN); Sourja Banerjee, Navi Mumbai (IN); Pankaj Bhausaheb Shinde, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 17/046,737

(22) PCT Filed: Mar. 28, 2019

(86) PCT No.: PCT/IB2019/052537
§ 371 (c)(1),
(2) Date: Oct. 9, 2020

(87) PCT Pub. No.: WO2019/197933
PCT Pub. Date: Oct. 17, 2019

(65) Prior Publication Data
US 2021/0165698 A1 Jun. 3, 2021

(30) Foreign Application Priority Data
Apr. 10, 2018 (IN) .............................. 201821013755

(51) Int. Cl.
*G06F 9/54* (2006.01)
*G06F 12/0875* (2016.01)
(Continued)

(52) U.S. Cl.
CPC .......... *G06F 9/542* (2013.01); *G06F 12/0875* (2013.01); *H04L 41/0631* (2013.01); *H04L 67/2857* (2013.01); *G06F 2212/604* (2013.01)

(58) Field of Classification Search
None
See application file for complete search history.

(56) References Cited

U.S. PATENT DOCUMENTS 8,935,710 B1 * 1/2015 Marathe .................. G06F 9/542
719/318
9,069,666 B2 6/2015 Hawkins et al.
(Continued)

FOREIGN PATENT DOCUMENTS

IN 201637028989 9/2017

OTHER PUBLICATIONS

International Search Report received in PCT/IB2019/052537, dated Jul. 16, 2019, 2 pages.

*Primary Examiner* — Craig C Dorais
(74) *Attorney, Agent, or Firm* — Klarquist Sparkman, LLP

(57) ABSTRACT

Embodiments of the present disclosure relate to automated troubleshooting of at least one user device and accordingly perform at least one action on the at least one user device, wherein the at least one action is performed for troubleshooting of the at least one user device. In an embodiment, the automated troubleshooting system receives at least one query from the user of the at least one user device and identifies at least one intent from said at least one query. Thereafter, said system determines at least one tag corresponding to the at least one intent and processes the at least one tag to determine at least one event corresponding to the at least one action to be performed. Finally, said system performs the at least one action on the at least one user device based on the at least one event.

11 Claims, 8 Drawing Sheets

(51) Int. Cl.
*H04L 41/0631* (2022.01)
*H04L 67/5683* (2022.01)

(56) References Cited

U.S. PATENT DOCUMENTS

2017/0171326 A1\* 6/2017 Luo ........................ H04L 67/20
2019/0173959 A1\* 6/2019 Biswas ............... H04L 41/0631

\* cited by examiner

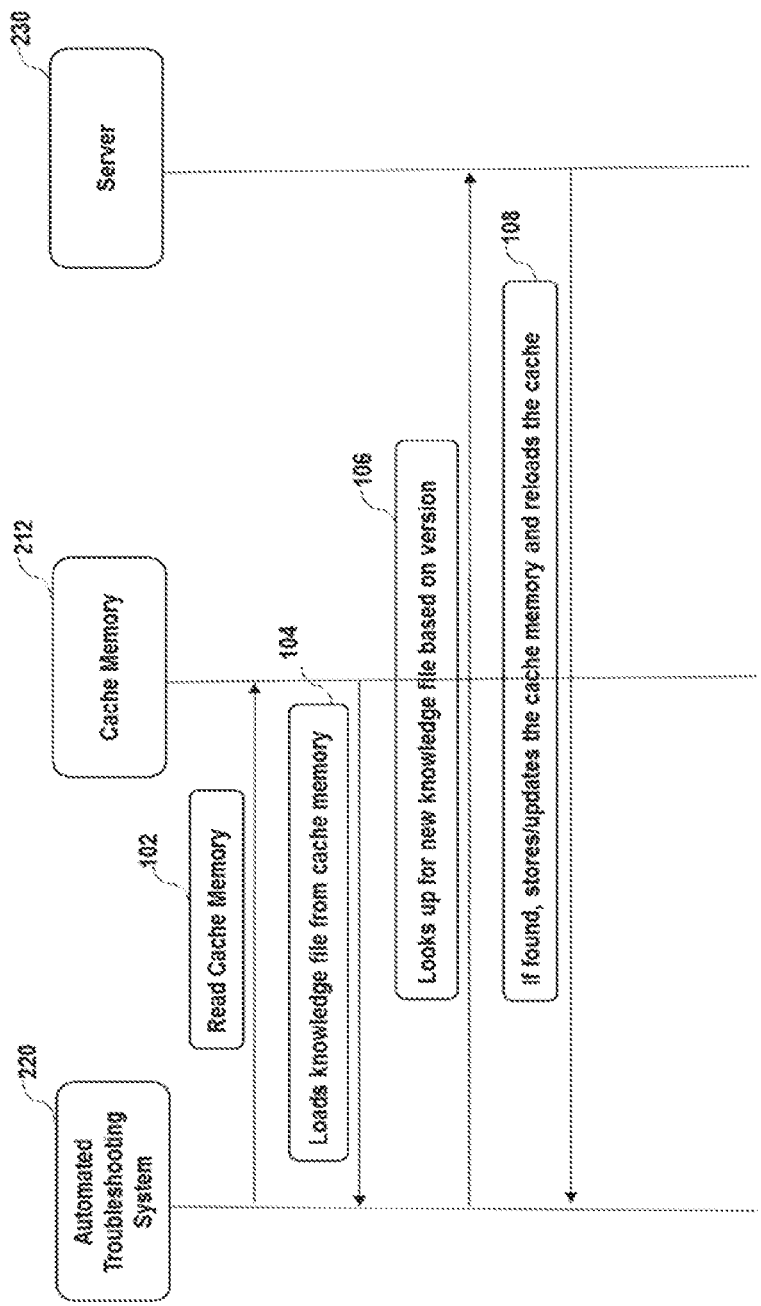

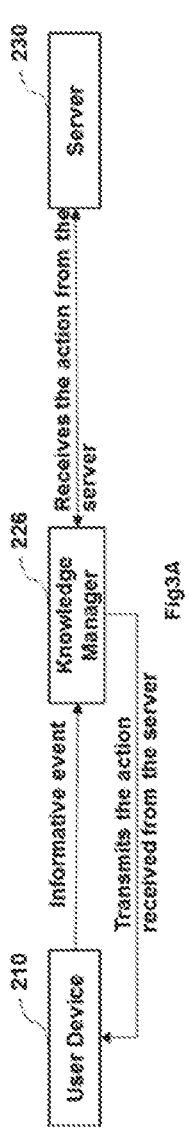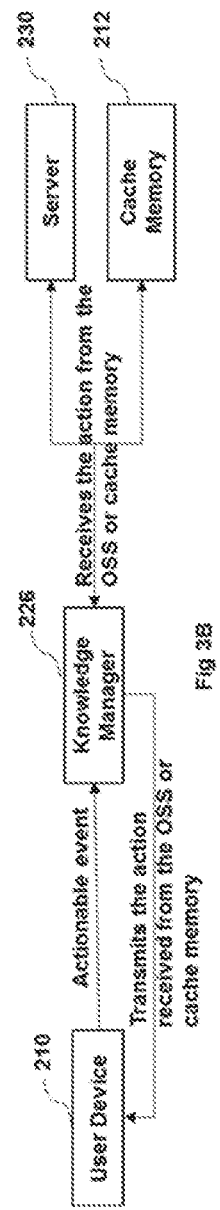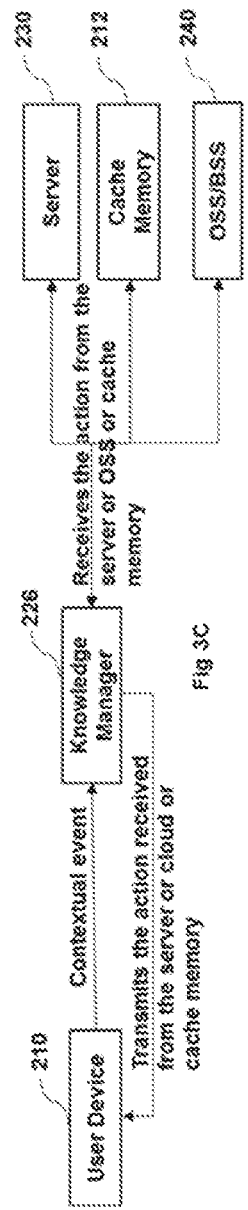

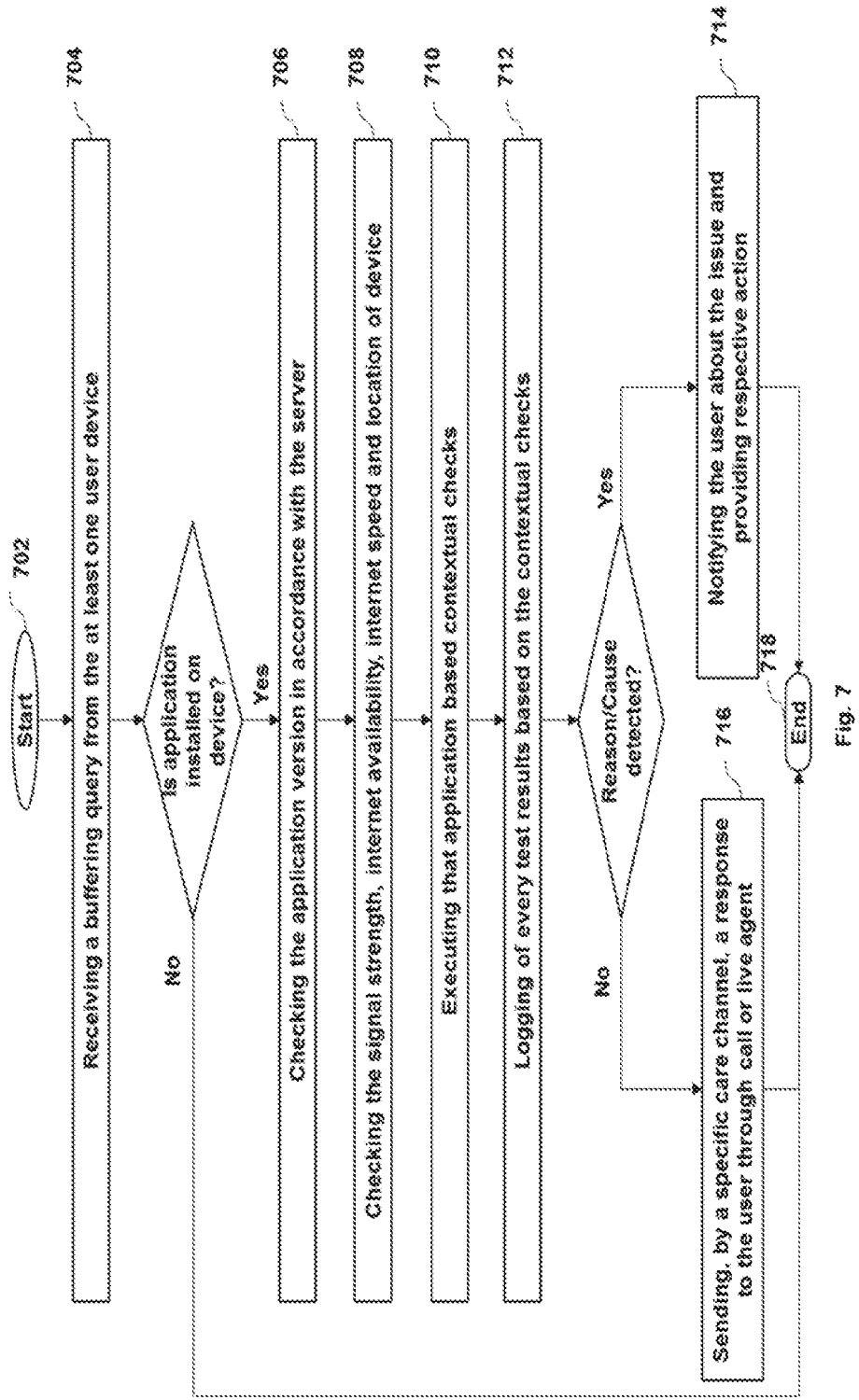

AUTOMATED TROUBLESHOOTING SYSTEM AND METHOD FOR PERFORMING AN ACTION ON A USER DEVICE

CROSS REFERENCE TO RELATED APPLICATIONS

This is the U.S. National Stage of International Application No. PCT/IB2019/052537 filed Mar. 28, 2019, which was published in English under PCT Article 21(2), which in turn claims the benefit of India Application No. 201821013755, filed in India on Apr. 10, 2018. Both applications are incorporated herein by reference in their entirety.

FIELD OF INVENTION

The present disclosure generally relates to troubleshooting and diagnosis of a user device and is more specifically, directed to an automated troubleshooting method and system for performing at least one action on at least one user device.

BACKGROUND

Presently, the advancements in wireless technologies such as GSM, EDGE, HSPA, LTE, etc. facilitate the wireless network (deployed with multiple access networks) to provide various communication services such as voice, video, data, advertisement, content, messaging, and broadcasts. Alongside, use and development of the communication channels have grown exponentially and in fact this growth is enhanced by availability of the heterogeneous networks with more reliable protocols, better communication network and consumer hardware.

Further, now-a-days, the users have an option in the user/computing device to select from multiple features/services such as voice calling, messaging, video calling and many other value added services. One of said multiple features is voice call and message that are considered as valuable important tools of communication because of the unique features such as voice identification, behaviour, accent, emotion and ancillary information that the users may easily and efficiently communicate in the call and message. Another such feature is the Caller ID display that provides/displays rich communication information on the user device, thereby providing an option to the users to accept/decline the call or allow for other call handling features to be applied on the incoming call. Yet another feature available to the users is an Integrated Conversational Interface (ICI) that may be engaged in form of a conversational dialog (for example speech command) using natural language recognition system based on the user's demand. This voice enabled assistance feature can be implemented using any platforms such as device APIs, the web, email, etc. Also, this voice enabled assistance feature facilitates speech command to dial numbers/contacts or send messages to the contacts as stored in personal contact lists of the user device. The conversational interface has other functionalities including, but not limiting to, controlling various features and operations of a user device, diagnosing the user device, providing solutions of in-service customer problems, facilitating call services that interface with functionality and applications on the user device via APIs or other means, and performing functions and operations that might otherwise be initiated using the conventional user interface on the user device. The conversational interface and the ability to obtain information and perform follow-on task, are implemented by coordinating various components such as command module, natural language module, dialog module, task management module, information management module and/or a plurality of external services. The conversational interface can also be implemented via the already existing third party's applications like Google Voice application, Nuance application, Diction application, etc., readily available for integration in the system.

While the growth of communication voice/video calls and messaging with rich communication message has opened arena of new technology development by providing new solutions to few existing problems, there has been an emerging challenge in diagnosing and troubleshooting of the user devices for customer in-service experience with the increase in the number of user devices and native applications. One such challenge is to efficiently respond to customers/users due to non-availability of the tools required to provide the best solution for the increasing problems, thereby leading to bad user experience. In said regard, there are various existing systems and methods that deal with the customer's issues for improving customer in-service experience. Also, a user experience management (UEM) has become a fundamental tool for network operators, especially for mobile network operators which often point to their network speed and coverage areas to attract and retain users/subscribers. However, said existing systems and methods face multiple challenges in achieving the objective of providing solutions to customer's issues and concerns. One such challenge is to meet expectations of the users to provide high quality services on any type of user device in response to the problems for customer in-service. Another challenge is to provide prompt and high quality services on any type of user device for the problems for customer in-services. Yet another challenge is to prioritise the customer's issues and concerns, and consequently provide an optimized solution effectively. More importantly, the existing systems and methods fail to solve the customer's issues without intervention of the customer care executives on behalf of a network operator i.e. in said existing systems and methods, the solution (to customer's issues) is handled by a customer executives who may be unaware of the customer's problems and have to manually look into all parameters to find the correct reason/solution for the customer's issues. Therefore, the existing systems and methods are incapable to cater to the user's issues and diagnose user devices; and trouble shoot problems for customer in-service experience independently and without an involvement of customer care executive on behalf of the network operator with the Integrated Conversational Interface (ICI).

Accordingly, in order to overcome the aforementioned problems inherent in the existing solutions for diagnosing and troubleshooting the user device, there exists a need of an automated troubleshooting and diagnosis method for catering the user's queries and provide an adequate solution to said queries without intervention of the customer care executives on behalf of the network operator.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to an automated troubleshooting method for performing at least one action on at least one user device. The method comprising: receiving at least one query from a user of the at least one user device, wherein the at least one query is related to the troubleshooting of the at least one user device, and the at least one query is received via an interface; identifying at least one intent from the at least one query received from the user of the at least one user device; determining at least one tag corresponding to the at least one intent; processing the at least one tag to determine at least one event, wherein each of the at least at one event corresponds to the at least one action, and the at least one event comprises one of a contextual event, an informative event, a generic event and an actionable event; and performing the at least one action on the at least one user device, wherein the at least one action is based on the at least one event, and the at least one action is performed for troubleshooting of the at least one user device.

Further, the embodiments of the present disclosure encompass an automated troubleshooting system for performing at least one action on at least one user device. The system comprising: an interface configured to receive at least one query from a user of the at least one user device, wherein the at least one query is related to the troubleshooting of the at least one user device; an intent manager configured to identify at least one intent from the at least one query received from the user of the at least one user device; a knowledge manager configured to: determine at least one tag corresponding to the at least one intent, and process the at least one tag to determine at least one event, wherein each of the at least at one event corresponds to the at least one action, and the at least one event comprises one of a contextual event, an informative event, a generic event and an actionable event; and an action module configured to perform the at least one action on the at least one user device, wherein the at least one action is based on the at least one event, and the at least one action is performed for troubleshooting of the at least one user device.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

FIG. 1 illustrates an exemplary embodiment of the present disclosure that encompasses a signalling flow diagram [100] illustrating a pre-requisite relating to pre-configuring a cache memory located at a user device.

FIG. 3A, FIG. 3B and FIG. 3C illustrate exemplary use cases for multiple exemplary events for troubleshooting of the user device in accordance with the embodiments of the present disclosure.

FIG. 7 illustrates an exemplary embodiment of the present disclosure that encompasses a method [700] for diagnosis of an application/software and detecting the application for which the user using the user device is facing the buffering.

DETAILED DESCRIPTION

Figure 2A:
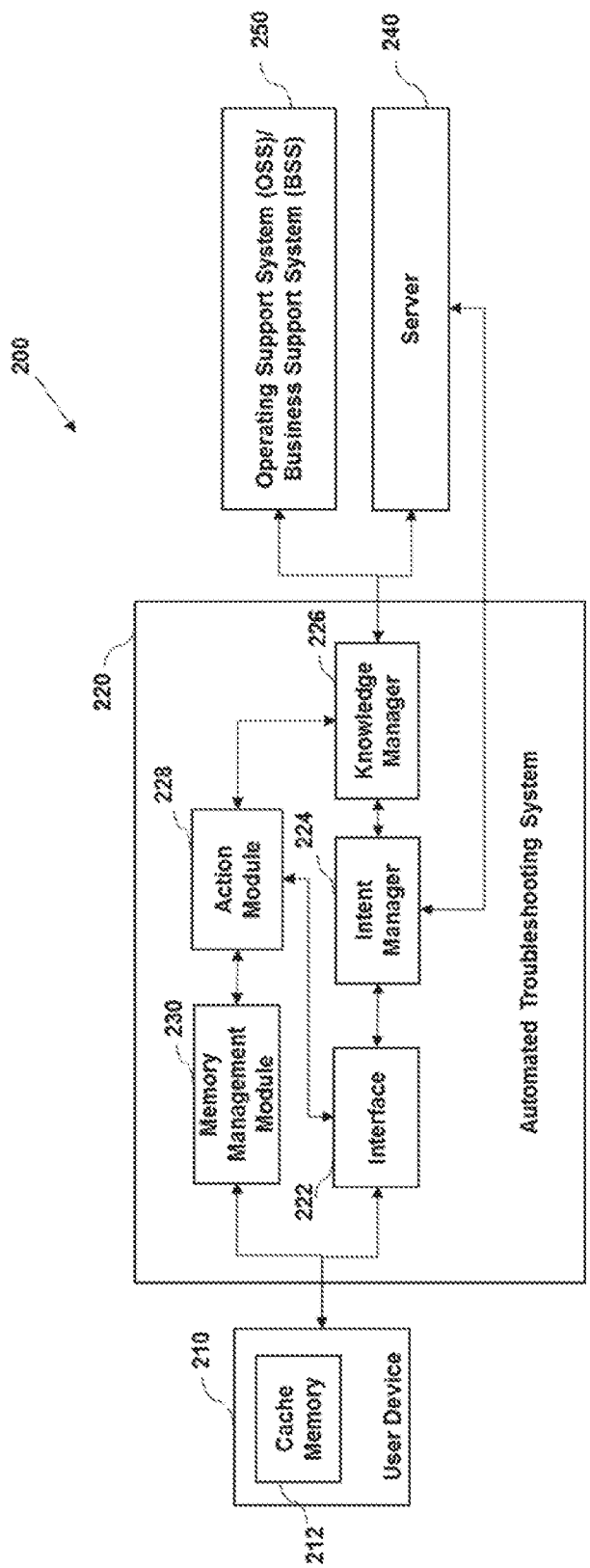
FIG. 2A illustrates an exemplary system architecture [200] for automated troubleshooting of a user device in accordance with an embodiment of the present disclosure where the automated troubleshooting system is located at the network side.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to an automated troubleshooting system and a method for performing an action on a user device pursuant to the diagnosis of the user device. As a prerequisite for enabling the system to determine a tag, an event, an action or any such information as may be obvious to person skilled in the art, a memory management module of the automated troubleshooting system pre-configures a cache memory, located at the user device, with at least one of the tag, the event, the action and any such information as may be obvious to person skilled in the art. FIG. 1 illustrates a signalling flow diagram [100] for pre-configuring the cache memory [212] located at the user device. The following steps describe the pre-requisites of pre-configuring the cache memory of the user device:

At step 102, as soon as the automated troubleshooting system [220] starts, the automated troubleshooting system [220] may be configured to read the cache memory [212] and check/search for a knowledge file comprising at least one of the tag, the event and the action to be performed on the user device.

At step 104, the automated troubleshooting system [220] may be configured to load/save said knowledge file at the automated troubleshooting system [220].

At step 106, the automated troubleshooting system [220] may be configured to search for new knowledge file based on a new version or any update available.

At step 108, the automated troubleshooting system [220] may be configured to save the new/updated knowledge file in the automated troubleshooting system [220].

Further, pursuant to the pre-configuration of the cache memory [212], when a user using the user device experiences an issue or seeks solution to any concern related to network, the user device, signal strength, applications running on the user device, etc., the user has capability to communicate with the automated troubleshooting system [220] that has capability to resolve the issues and concerns without depending on the respective customer care executives, thereby avoiding delay. The automated troubleshooting system [220] of the present disclosure is configured to perform the action based on the troubleshooting of the user device, wherein the automated troubleshooting system [220] resides either at the user device or at the network end. When said automated troubleshooting system receives a query (related to the troubleshooting) from the user using the user device through an interface of the automated troubleshooting system [220], said automated troubleshooting system [220] identifies an intent from the query to further determine a tag from the intent, wherein the tag is one of a pre-defined tag and a real time created tag. Subsequently, said automated troubleshooting system [220] processes the tag and determines an event such as contextual event, an informative event, a generic event, an actionable event, etc., wherein each of the event corresponds to the action. Based on the event determined, the automated troubleshooting system [220] performs the action on the at least one user device for troubleshooting of the at least one user device. Further, the present invention also encompasses updating of said cache memory in every instance the action is performed on the user device.

The process of the troubleshooting and diagnosis as used herein may refer to an automated process of detecting the issues in the user device and identifying the solutions to said detected issues with the help of the automated troubleshooting system that may be configured to perform an action on the user device based on the issues faced by the user using the device. Further, said troubleshooting and diagnosis may be performed in real time in a preferred embodiment.

The user device as used herein may refer to any computing device including, but not limiting to, a mobile phone, a smart phone, a laptop, a tablet, a computer, a desktop and any such device as may be obvious to a person skilled in the art. In a preferred embodiment, said user device may comprise the automated troubleshooting system [220]. In an embodiment, the user device may comprise the automated troubleshooting system [220] in form of one of an application, a software, a hardware, a combination thereof and any such format as may be obvious to person skilled in the art. Said automated troubleshooting system [220] may have capability to diagnose the user device and troubleshoot any issue faced by the user using the user device. Additionally, said automated troubleshooting system [220] may have the capability to communicate with at least one server/Operating Support System (OSS)/Business Support System (BSS) without intervention of the customer care executives, to find out a solution to the issues faced by the user. Also, the user device may comprise the cache memory [212] for storing said knowledge file. Further, the user device may comprise an input means such as a keyboard, an operating system, a memory unit, a display interface, etc.

The at least one server as used herein may refer to a computer software/hardware capable of storing the information and sharing the stored information with the client/users whenever required, wherein said information may include, but not limited to, the event, the tag, a contextual action, a computational action, the diagnostic check. Also, said at least one server may include, but not limited to a machine learning server, a data repository, a cloud host server and any such server as may be obvious to person skilled in the art.

The OSS/BSS as used herein may refer to a set of programs and instructions required by a communication service provider in monitoring, controlling, analysing and managing a computer network. Also, the OSS/BSS may refer to internal systems that include, but not limited, an application server and telecom servers. Thus, the OSS and BSS when operated together support a range of telecommunication services.

The interface as used herein may refer to any conversational dialog having capability to receive user's inputs/information and perform related actions. For e.g. a speech command using a natural language recognition system may be implemented using different platforms such as device APIs, the web, email and any such platform as may be obvious to person skilled in the art. Also, the interface may be implemented via already existing third party's applications readily available for integration in the system.

The intent as used herein may refer to an intention or purpose of the user using the user device. Said intent may be derived/identified from the query received from the user using the user device, wherein the query may be related to the troubleshooting of the user device. For instance, the user enters a query "My internet service is slow". Then, the intent identified from said query is "Slow internet" i.e. the intent will be that the user is facing problems related to slow internet.

The tag as used herein may be a category that may be one of pre-defined or real time created by the cellular operator, wherein the category may be defined for determining the area of problem where the user is facing the issues. In an embodiment where the tag may be the pre-defined tag, the tag may include, but not limited to, network, billing, data service, voice service, general issues, device issues and existing connections with the user device. In yet another embodiment, the tag may be real time created by the automated troubleshooting system based on the query of the user in an event there is no pre-defined tag for said query. For instance, when the intent is identified as "Slow internet", the automated troubleshooting system may determine the corresponding tag as "Network", since the slow internet query may be related to the network issue. Similarly, when the intent is identified as "Signal strength" for the user query ("The signal strength in my home location is weak", for such intent, the automated troubleshooting system may now determine the tag as "Network". Therefore, there may be a common/single tag for multiple user's intent derived from the user's query. In another example, if the intent is identified as "I am unable to place any data or voice call", the tag may be determined as "Network".

The event as used herein may refer to the nature/type of the issues/concerns of the user using the user device. The event may be based on the user's query and may comprise one of a contextual event, an informative event, a generic event, an actionable event and any such event as may be obvious to person skilled in the art. Furthermore, each of said event corresponds to the action to be performed on the user device.

The action as used herein may refer to one of executing at least one service on the user device and sending a notification to the user device, wherein the notification may indicate execution of the action performed on the user device. Further, said at least one service may include, but not limited to, an internet service, a computation service, a data service, a voice service, an augmented service, a virtual reality service displaying any information required by the user, connecting the user with customer care executives, fetching balance, determining call usage of the user device and any such service as may be obvious to person skilled in the art. Furthermore, the action is one of a pre-existing action and a real time created action i.e. in an event the cache memory and the at least one server do not contain the action for specific event, the automated troubleshooting system may create a real time action for that particular event.

Figure 2B:
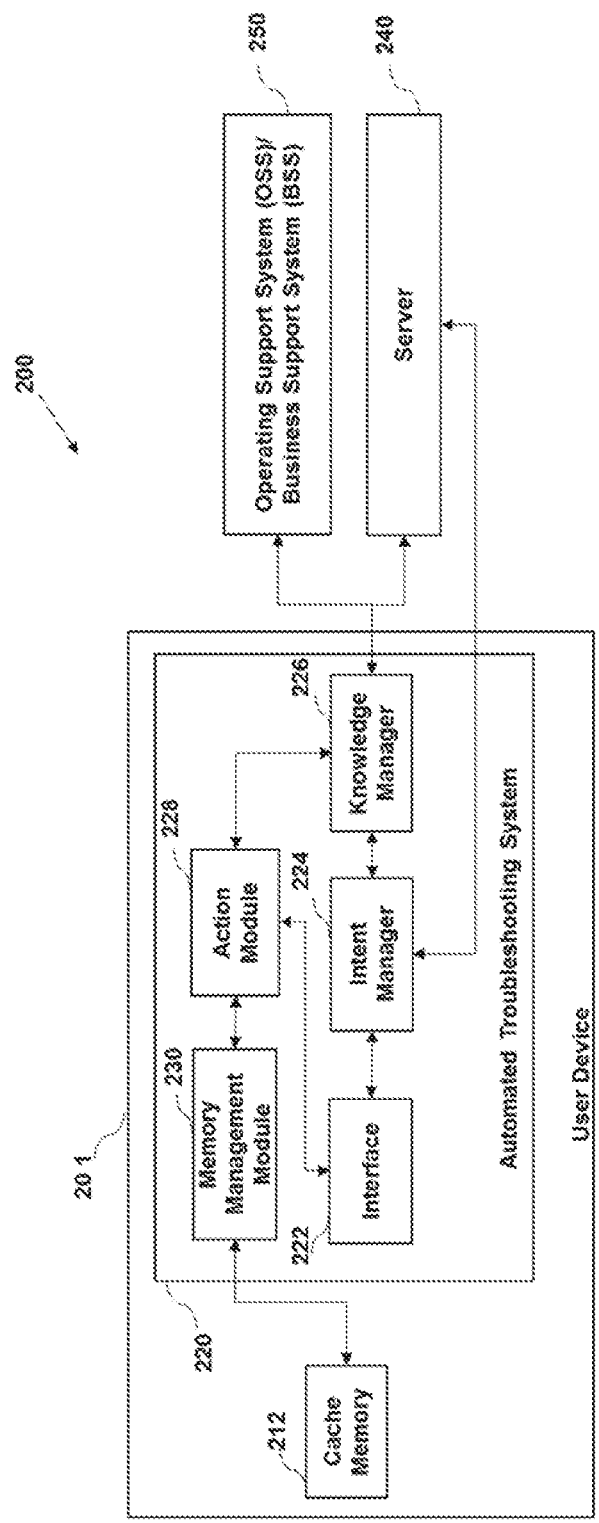
FIG. 2B illustrates an exemplary system architecture [200] for automated troubleshooting of a user device in accordance with an embodiment of the present disclosure where the automated troubleshooting system is located at the user device.

FIG. 2A and FIG. 2B illustrate a system architecture [200] for automated troubleshooting of a user device in accordance with embodiments of the present disclosure. As illustrated, the system architecture [200] may comprise at least one user device [210], an automated troubleshooting system [220], at least one server [240] and an Operating Support System (OSS)/Business Support System (BSS) [250], wherein the at least one user device [210] may comprise the cache memory [212]. The at least one user device [210], the automated troubleshooting system [220], the at least one server [240], the OSS/BSS [250] and the sub-components therein may be configured to work in conjunction and provide respective functionalities in order to achieve the objective of the present disclosure. Further, in an embodiment, the automated troubleshooting system [220] may be located at the user device [210] as one of a software, an application, a hardware, a combination thereof and any such format as may be obvious to person skilled in the art. In another embodiment, the automated troubleshooting system [220] may be the hardware located at the network end. Further, the automated troubleshooting system [200] may comprise an interface [222], an intent manager [224], a knowledge manager [226], an action module [228] and a memory management module [230], wherein the interface [222], the intent manager [224], the knowledge manager [226], the action module [228] and the memory management module [230] may be internally connected to each other for facilitating internal communication in accordance with the present disclosure. In an event the user faces an issue while using the at least one user device [210], the interface [222] of the automated troubleshooting system [220] may receive at least one query from the user using the at least one user device [210], wherein the interface [222] may a conversational interface or any such interface as may be obvious to person skilled in the art. The at least one query may relate to the troubleshooting of the at least one user device [210]. In an embodiment, the at least one query may be one of a text query, a voice query and a gesture query. Thus, the at least one query may be based on a text input, a voice input and a gesture input, wherein the gesture input includes, but not limited to, a finger movement, a face movement and a touch screen event such as pinch, double tap, scroll, long press etc. For instance, the user may enter the at least one query by typing or by sending a message, while in another instance, the user may enter the at least one query by speaking or sending a voice message or a speech command. Further, the intent manager [224] of the automated troubleshooting system [220] may be configured to identify the at least one intent from the at least one query received from the user using the at least one user device [210], wherein the at least one intent may specify the intention or purpose of the user using the at least one user device [210]. In an embodiment, the intent manager [224] may be configured to identify the at least one intent from one of the at least one server [240] and the cache memory [212], wherein the at least one server [240] may be a machine learning server. In an embodiment where the at least one query is a text query, the intent manager [224] may be configured to identify the at least one intent from the text query using one or more machine learning techniques including, but not limiting to, a neural network, a maxentropy, a tensornetwork, a topic based model (LDA/SLDA), libraries and services. Pursuant to the identification of the at least one intent, the knowledge manager [226] may be configured to determine the at least one tag corresponding to the at least one intent, wherein the at least one tag may refer to the category defined for determining the reason/area of problem where the user is facing issues. In an embodiment, the knowledge manager [226] may be configured to determine the at least one tag from one of the at least one server [240], the Operating Support System (OSS)/Business Support System (BSS) [250] and the cache memory [212], wherein the at least one server [240] may be a data repository. In one embodiment, the at least one tag may be a pre-defined tag including, but not limiting to, network, billing, data service, voice service, general issues, device issues and existing connections with the user device, while in another embodiment, the at least one tag may be real time tag created in that instance where the current at least one intent has no available tag from the pre-defined tags. Once the at least one tag is determined for each of the at least one intent, the knowledge manager [226] may be configured to process the at least one tag and determine at least one event corresponding to the at least one action, wherein the at least one event may refer to nature/type of the issues/concerns of the user using the at least one user device [210]. The at least one event may be based on the user's query and may comprise one of a contextual event, an informative event, a generic event, an actionable event and any such event as may be obvious to person skilled in the art. Thereafter, based on the at least one event determined, the knowledge module [226] may be configured to select the respective actions and inform the action module [228] about the at least one action to be performed for the troubleshooting of the at least one user device [210], wherein said at least one action may be one of a pre-existing action and a real time created action. The action module [228] may be then configured to perform the at least one action on the at least one user device [210]. In an embodiment, the action module [228], pursuant to performing the at least one action, may internally notify the execution of the at least one action to the interface [222] of the automated troubleshooting system [220]. On receiving said notification from the action module [228], the interface [222] may be configured to notify the execution of the at least one action to at least one user device [210]. Further, the memory management module [230] of the automated troubleshooting system [220] may be configured to update the cache memory [212] of the at least one user device [210] in an event the at least one action is performed on the at least one user device [210].

In an exemplary scenario, the at least one query received from the user using the at least one user device [210] is "Please call customer care to discuss my issues that I am facing in the user device". The intent identified from said query is "Call customer care". Based on said intent, the tag determined by the automated troubleshooting system [220] is "General Issues". Based on said tag, the event is determined as "Actionable event" and accordingly the at least one action is performed on the at least one user device [210] i.e. calling the customer care and connecting the customer care executive with the user of the at least one user device [210].

In another exemplary scenario, the query received from the at least one user device [210] is "I am unable to avail 4G services on my 4G enabled user device". The intent identified from said query is "Unavailability of 4G services on 4G enabled device". Based on said intent, two tags determined by the automated troubleshooting system [220] are "Network" and "Data Services". Based on said two tags, two events are determined as "Informative event" and "Actionable event" and accordingly the at least one action is performed on the at least one user device [210]. Based on the informative event, the action is executing a specific informational service such as providing, to the user, the information including, but not limiting to, the network, the data plan of the user etc.; whereas based on the actionable event, the action is one of updating the software/application installed at the at least one user device [210] or sending the system settings (to the user) to be configured on the at least one user device [210].

FIG. 3A, FIG. 3B and FIG. 3C illustrate exemplary use cases for multiple exemplary events for troubleshooting of the at least one user device [210] in accordance with the embodiments of the present disclosure. In the Use Case 1 where the at least one event may be determined as the informative event by the knowledge manager [226], the knowledge manager [226] may be configured to communicate with the at least one server [240] to perform the at least one action on the at least one user device [210], for e.g. providing the required information to the user. In the Use Case 2 where the at least one event may be determined as the Actionable event by the knowledge manager [226], the knowledge manager [226] may be configured to communicate with at least one of the at least one server [240] and the cache memory [212] to perform the at least one action on the at least one user device [210], for e.g. executing a specific action of connecting the user with the network operator. Further, the Use Case 3 illustrates an exemplary scenario where the at least one event may be determined as the Contextual event by the knowledge manager [226], wherein the contextual event may be determined in two exemplary scenarios. In first exemplary scenario where the at least one query is "network is not working properly", the knowledge manager [226] may first check if the strength of the mobile tower located in the vicinity of the at least one user device [210] is sufficient for providing the at least one service and may subsequently instruct the action module [228] to perform the at least one action such as informing the user using the at least one user device [210]. In second exemplary scenario where the at least one query is "what is my balance", the knowledge manager [226] may ask the user the specific type of service for which the balance is required for e.g. data balance, voice balance, etc. On receiving the instructions from the user, the knowledge manager [226] may process the information and may communicate with at least one of the at least one server [240], the OSS/BSS [250] and the cache memory [212]. Accordingly, the knowledge manager [226] may instruct the action module [228] to perform the at least one action such as providing the balance information to the user using the at least one user device [210].

Figure 4:
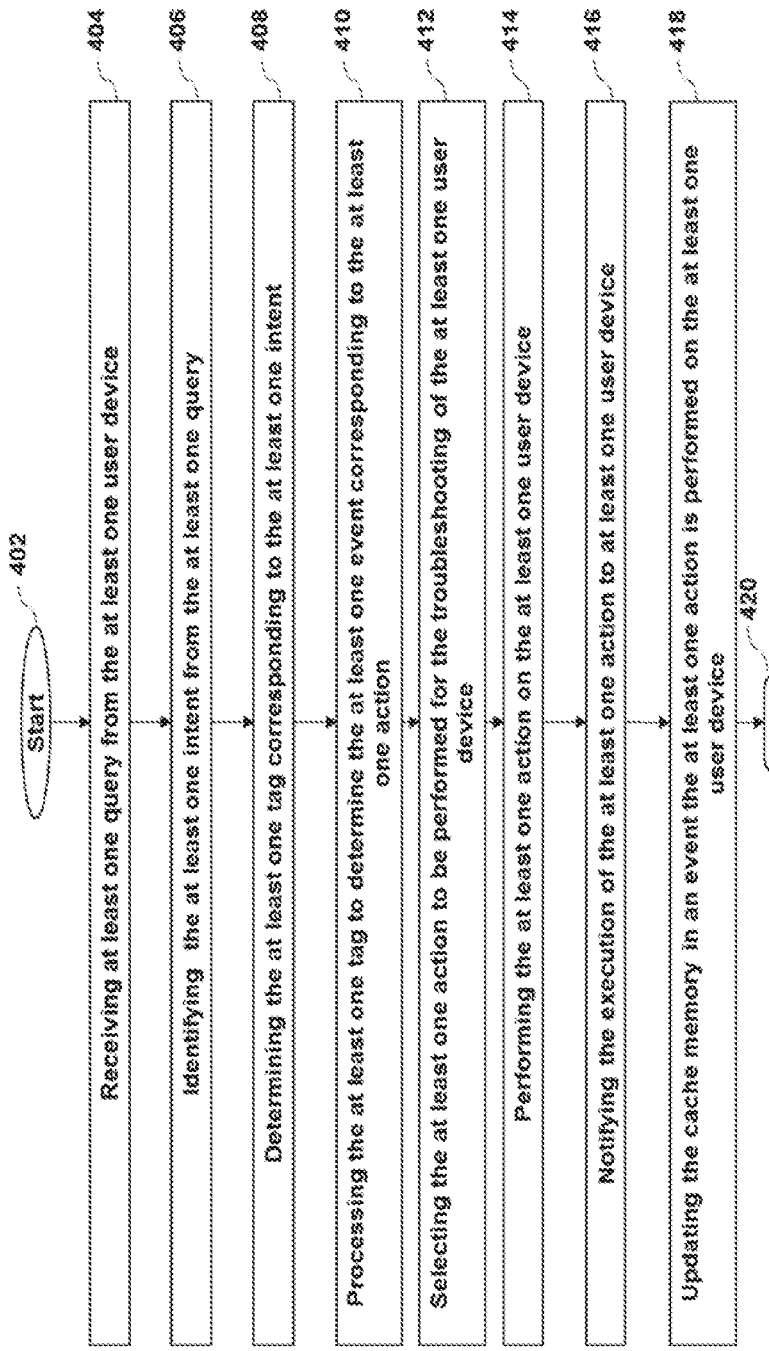
FIG. 4 illustrates an exemplary method [400] for automated troubleshooting of the user device in accordance with an embodiment of the present disclosure.

FIG. 4 illustrates an exemplary method flow diagram [400] comprising the method for automated troubleshooting of the at least one user device [210] in accordance with an embodiment of the present disclosure. The method [400] may initiate at step 402 where the memory management module [230] of the automated troubleshooting system [220] may pre-configure the cache memory [212] with at least one of the at least one tag, the at least one event, the at least one action and any such information as may be obvious to person skilled in the art.

At step 404, the interface [222] of the automated troubleshooting system [220] may receive the at least one query from the user using the at least one user device [210] in an event the user faces an issue while using the at least one user device [210]. The at least one query may be one of a text query, a voice query and a gesture query. Thus, the at least one query may be based on a text input, a voice input and a gesture input, wherein the gesture input includes, but not limited to, a finger movement, a face movement and a touch screen event such as pinch, double tap, scroll, long press etc.

The user may enter the at least one query by typing or by sending a message, while in another instance, the user may enter the at least one query by speaking or sending a voice message or speech command. Said at least one query may be then internally communicated to the intent manager [224] of the automated troubleshooting system [220]. For example, the query of the user is "My user device is hanging continuously and is functioning slowly".

At step 406, the intent manager [224] may identify the at least one intent from the at least one query received from the user using at least one user device [210]. Based on the exemplary at least one query received at step 404, the at least one intent is identified as "Slow device processing". Further, the intent manager [224] may identify the at least one intent from one of the at least one server [230] and the cache memory [212], wherein the at least one server [230] may be the machine learning server. Said at least one intent may be then internally communicated to the knowledge manager [226] of the automated troubleshooting system [220].

At step 408, the knowledge manager [226] may determine the at least one tag corresponding to the at least one intent. Based on the exemplary at least one intent identified in previous step 406, the at least one tag is "Device Issues". Further, the knowledge manager [226] may determine the at least one tag from one of the at least one server [230], the Operating Support System (OSS)/Business Support System (BSS) [240] and the cache memory [212], wherein the at least one server [230] may be the data repository. The at least one tag may be one of the pre-defined tag and the real time created tag.

At step 410, on determining the at least one tag, the knowledge manager [226] may process the at least one tag to determine the at least one event corresponding to the at least one action, wherein the at least one event comprises one of the contextual event, the informative event, the generic event and the actionable event based on the user's query. Based on the exemplary tag determined in previous step 408, the at least one event may be determined as "Actionable Event" and "Informative Event".

At step 412, on determining of the at least one event, the knowledge module [226] may select the at least one action to be performed for the troubleshooting of the at least one user device [210]. Based on the informative event, the at least one action may be sending (to the user) the information related to reasons behind the slow device processing, while based on the actionable event the at least one action may be one of checking the storage of the at least one user device [110], checking for any malware in the at least one user device [210] and asking the user to manage the storage memory. Further, said at least one action may be one of the pre-existing action and the real time created action. Furthermore, said at least one event may be then internally communicated to the action module [226] of the automated troubleshooting system [220].

At step 414, the action module [228] may then perform the at least one action on the at least one user device [210]. Further, the action module [228], pursuant to performing the at least one action, may internally notify the execution of the at least one action to the interface [222] of the automated troubleshooting system [220].

At step 416, on receiving said notification from the action module [228], the interface [222] may notify the execution of the at least one action to at least one user device [210].

At step 418, the memory management module [230] of the automated troubleshooting system may update the cache memory [212] in an event the at least one action is performed on the at least one user device [210]. The method [400] may terminate at step 420.

Figure 5:
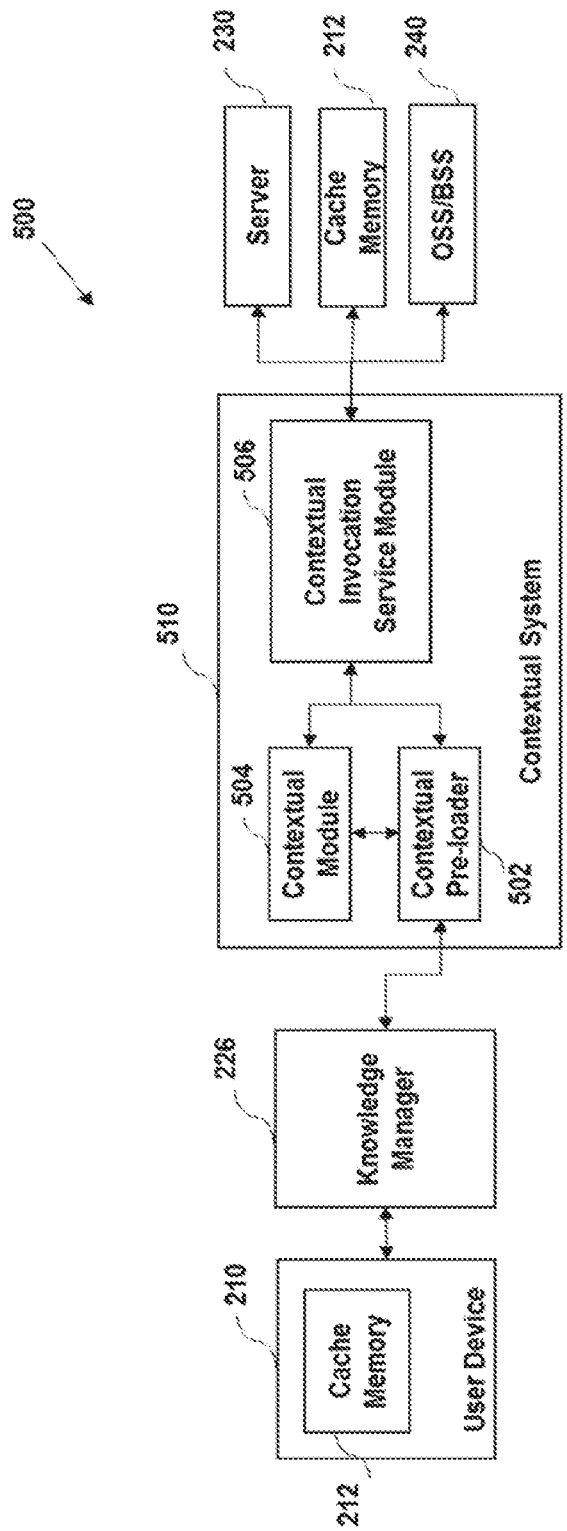
FIG. 5 illustrates an exemplary embodiment of the present disclosure that encompasses a contextual system architecture [500] for automated troubleshooting the user device in an event the query received from the user is a contextual query.

FIG. 5 illustrates an exemplary embodiment of the present disclosure that encompasses a system architecture [500] for a contextual system [510] for troubleshooting the at least one user device [210] in an event the at least one query received from the user using the at least one user device is the contextual query i.e. the at least one event associated with the at least one query is the contextual event. The contextual system architecture [500] may comprise the at least one user device [210], a contextual system [510], the knowledge manager [226], the at least one server [240], the cache memory [212] and the Operating Support System (OSS)/Business Support System (BSS) [250]. The contextual system [510] may comprise a contextual pre-loader [502], a contextual module [504] and a contextual invocation service module [506]. Further, in an embodiment, the contextual system [510] may be located at the least one user device [210] as one of a software, an application, a hardware, a combination thereof and any such format as may be obvious to person skilled in the art, while in another embodiment, the contextual system [510] may be a hardware located at the network end. Furthermore, the at least one user device [210], the contextual system [510], the knowledge manager [226], the at least one server [240], the cache memory [212], the Operating Support System (OSS)/Business Support System (BSS) [250] and the sub-components therein may be configured to work in conjunction and provide respective functionalities in order to achieve the objective of the present disclosure.

Further, in an event the knowledge manager [226] processes the at least one tag (based on the at least one intent of the at least one query received from the user using the at least one user device [220]) and determines the at least one event as the contextual event, the knowledge manager [226] may be configured to notify the contextual event to the contextual pre-loader [502] of the contextual system [510] and the contextual system [510] may be activated, wherein each of the at least one tag corresponds to a leaf node indicating the at least one action to be performed on the at least one user device [210]. Thereafter, the contextual invocation service module [506] of the contextual system [510] may be configured to process each of the at least one leaf node and performs the at least one action on the at least one user device [110] till the adequate result is achieved and the user is satisfied. For example, initially when the at least one action is performed but the user is not convinced with said at least one action, then the contextual invocation service module [506] may be configured to further determine the next at least one action to be performed and this process (of determining and performing next action/s) continues till the desired solution to the user's query is determined and the user is satisfied. Also, the Contextual Module [504] may be configured to store the knowledge file comprising at least one of the tag, the event, the action to be performed on the least one user device [210] and any such information as may be obvious to a person skilled in the art.

Figure 6:
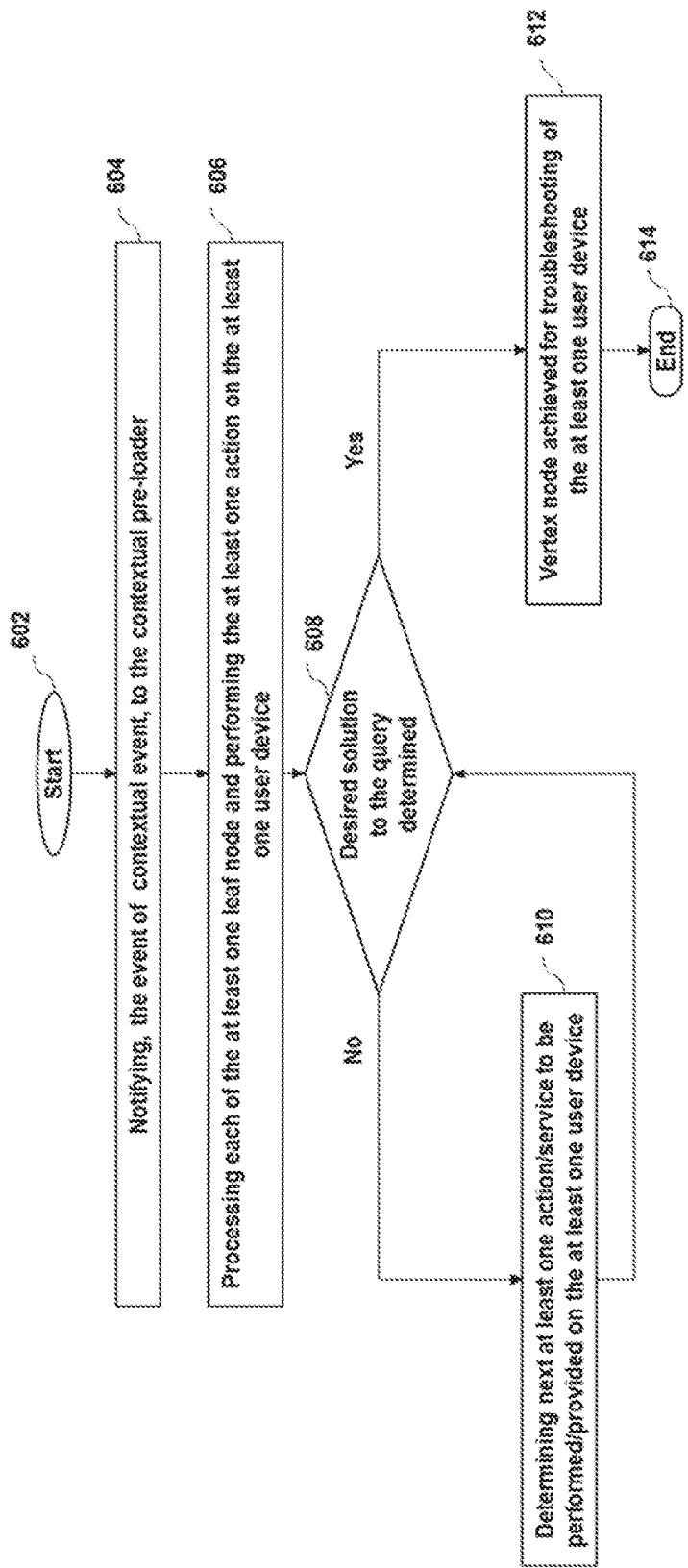
FIG. 6 illustrates an exemplary embodiment of the present disclosure that encompasses a method [600] for automated troubleshooting the user device in an event the query received from the user is a contextual query.

FIG. 6 illustrates an exemplary embodiment of the present disclosure that encompasses a method [600] for troubleshooting the at least one user device [210] in an event the at least one query received from the user using the at least one user device [210] is the contextual query. The method [600] may initiate at step 602 where the knowledge manager [226] processes the at least one tag (based on the at least one intent of the at least one query received from the user using at least one user device [220]) and determines the at least one event as the contextual event.

At step 604, knowledge manager [226] may notify the determining of the contextual event to the contextual pre-loader [502] of the contextual system [510] and the contextual system [510] may be activated. Each of the at least one tag corresponds to the leaf node indicating the at least one action to be performed on the at least one user device [210]. In particular, the leaf node may indicate at least one action performed at a first/initial level, while a vertex node may indicate that node where the desired solution to the user's query is determined and the user is satisfied with the at least one action. In an embodiment, the leaf node may be the vertex node in an event the user is satisfied and the desired solution to the user's query is determined at the leaf node without the need of further processing. Said notification may further be indicated to the contextual invocation service module [506] of the contextual system [510].

At step 606, the contextual invocation service module [506] may process each of the at least one leaf node and performs the at least one action on the at least one user device [110].

At step 608, the contextual invocation service module [506] may further determine whether or not the desired solution to the user's query is determined. In an event, the desired solution is not achieved, the method [600] may lead to subsequent step 610. Alternatively, if the desired solution is achieved and the user is satisfied, the method [600] may lead to step 612.

At step 610, the contextual invocation service module [506] may further determine next at least one action to be performed on the at least one user device [210]. The method [600] may then go back to step 608.

At step 612, the vertex node is achieved in an event the desired solution is determined. The method [600] may then terminate at step 614 with the completion of the troubleshooting of the at least one user device [210].

FIG. 7 illustrates an exemplary embodiment of the present disclosure that encompasses a method [700] for diagnosis of an application/software and detecting the application for which user using the at least one user device [210] is facing a buffering issue. The method [600] may initiate at step 702 where the user is facing an issue with regard to any application/software installed in the at least one user device [210].

At step 704, the automated troubleshooting system [220] may receive the at least one query from the at least one user device [210] in an event the user faces a buffering issue, wherein the at least one query may comprise the information of the application/software where the user is facing the buffering issue. The at least one query may be one of the text query and the voice query. Further, the automated troubleshooting system [220] may check whether or not said application/software is installed at the at least one user device [210]. In an event the application/software is installed at the at least one user device [210], the method [700] may lead to step 706. Alternatively, the method [700] may terminate at step 718.

At step 706, the automated troubleshooting system [220] may identify the application/software version with respect to the at least one server [240].

At step 708, the automated troubleshooting system [220] may determine at least one of the signal strength, internet availability, internet speed and location of the at least one user device [210].

At step 710 and pursuant to accomplishment of steps 706 and 708, the automated troubleshooting system [220] may execute at least one application/software based contextual check for detecting the reason/cause/issue of the buffering.

At step 712, the automated troubleshooting system [220] may analyse and store each test result obtained from the at least one contextual check performed in the previous step 710. In an event the reason of the buffering is detected, the method [700] may lead to step 714. Alternatively, the method [700] may lead to step 716.

At step 714, the automated troubleshooting system [220] may send the at least one action to the user of the at least one user device [210]. The method [700] may then terminate at step 718.

At step 716 where the reason of the buffering is not detected, the automated troubleshooting system [220] may send a response to the user of the at least one user device [210] via one of a voice call and an agent, wherein the response may comprise information related to diagnostic logs, user actions and any such information as may be obvious to person skilled in the art. In an embodiment, the response may be sent to the user through a specific care channel. In an embodiment, the agent may be a live agent.

Therefore, the present disclosure encompasses a mechanism for performing the at least one action on at least one user device [210] based on the troubleshooting and diagnosis of the at least one user device [210]. The present disclosure further encompasses troubleshooting of the at least one user device [210] and performing desired at least one action independently without any intervention of the customer care executives, thereby catering the user's problems/issues in an efficient and effective manner and enhancing the user experience. Also, the present disclosure encompasses remote access to users, thereby allowing distributed diagnosis and troubleshooting of in-service problems/issues of the users using the at least one user device [210].

Though a limited number of the user device [210], the automated troubleshooting system [220], the at least one server [240], the Operating Support System (OSS)/Business Support System (BSS) [250], the contextual system [510] and the subcomponents therein have been shown in the figures; however, it will be appreciated by those skilled in the art that the system [100] of the present disclosure encompasses any number and varied types of the components/modules and other components/sub systems as may be obvious to person skilled in the art.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. An automated troubleshooting method for performing at least one action on at least one user device [210], the method comprising receiving at least one query from a user of the at least one user device [210], wherein the at least one query is related to the troubleshooting of the at least one user device [210], and the at least one query is received via an interface [222];

identifying at least one intent from the at least one query received from the user of the at least one user device [210];

determining at least one tag corresponding to the at least one intent;

processing the at least one tag to determine at least one event, wherein each of the at least at one event corresponds to the at least one action, and the at least one event comprises one of a contextual event, an informative event, a generic event and an actionable event; and performing the at least one action on the at least one user device [210], wherein the at least one action is based on the at least one event, and the at least one action is performed for troubleshooting of the at least one user device [210].

2. The automated troubleshooting method as claimed in claim 1, further comprising preconfiguring a cache memory [212] with at least one of the at least one tag, the at least one event and the at least one action, wherein the cache memory is located at the at least one user device [210].

3. The automated troubleshooting method as claimed in claim 1, further comprising updating the cache memory [212] in an event the at least one action is performed on the at least one user device [210].

4. The automated troubleshooting method as claimed in claim 1, wherein the at least one action is one of a pre-existing action and a real time created action.

5. The automated troubleshooting method as claimed in claim 1, wherein the at least one action comprises at least one of executing at least one service on the at least one user device [210] and sending a notification to the at least one user device [210].

6. The automated troubleshooting method as claimed in claim 1, wherein the at least one query is one of a text query, a voice query and a gesture query.

7. The automated troubleshooting method as claimed in claim 1, wherein the at least one intent is identified from one of at least one server [240] and the cache memory [212].

8. The automated troubleshooting method as claimed in claim 1, wherein the interface [222] is located at an automated troubleshooting system [220].

9. The automated troubleshooting method as claimed in claim 1, wherein the least one tag is one of a pre-defined tag and a real time created tag.

10. An automated troubleshooting system [220] for performing at least one action on at least one user device [210], the automated troubleshooting system [220] comprising:

an interface [222] configured to receive at least one query from a user of the at least one user device [210], wherein the at least one query is related to the troubleshooting of the at least one user device [210];

an intent manager [224] configured to identify at least one intent from the at least one query received from the user of the at least one user device [210];

a knowledge manager [226] configured to:

determine at least one tag corresponding to the at least one intent, and process the at least one tag to determine at least one event, wherein
   each of the at least at one event corresponds to the at least one action, and
   the at least one event comprises one of a contextual event, an informative event, a generic event and an actionable event; and
an action module [228] configured to perform the at least one action on the at least one user device [210], wherein
   the at least one action is based on the at least one event, and
   the at least one action is performed for troubleshooting of the at least one user device [210].

11. The automated troubleshooting system [220] as claimed in claim 10, further comprising a memory management module [230], wherein the memory management module [230] is configured to:
   preconfigure a cache memory [212] with at least one of the at least one tag, the at least one event and the at least one action, wherein the cache memory is located at the at least one user device [210], and
   update the cache memory [212] in an event the at least one action is performed on the at least one user device [210].

* * * * *